United States Patent [19]
Kinser et al.

[11] Patent Number: 5,929,331
[45] Date of Patent: Jul. 27, 1999

[54] MULTI-DIRECTIONAL, THREE COMPONENT VELOCITY MEASUREMENT PRESSURE PROBE

[75] Inventors: Robert E. Kinser, Bryan; Othon K. Rediniotis, College Station, both of Tex.

[73] Assignee: The Texas A&M University System, College Station, Tex.

[21] Appl. No.: 09/005,941

[22] Filed: Jan. 12, 1998

Related U.S. Application Data

[60] Provisional application No. 60/037,087, Jan. 14, 1997.
[51] Int. Cl.$^6$ .............................. G01M 9/02; G01M 9/06
[52] U.S. Cl. ............................................. 73/147; 73/866.5
[58] Field of Search ..................................... 73/147, 866.5

[56] References Cited

U.S. PATENT DOCUMENTS

| | | | |
|---|---|---|---|
| 3,699,811 | 10/1972 | Maiden et al. ......................... | 73/147 X |
| 5,423,209 | 6/1995 | Nakaya et al. ............................ | 73/182 |

OTHER PUBLICATIONS

Sellers, III, et al., "The Basic Aerodynamics Research Tunnel—A Facility Dedicated to Code Validation," AIAA–88–1997, AIAA 15th Aerodynamic Testing Conference, May 18–20, 1988, pp. 1–12.

Zilliac, "Calibration of Seven–Hole Pressure Probes for Use in Fluid Flows with Large Angularity," NASA Technical Memorandum 102200, National Aeronautics and Space Administration—Ames Research Center, Dec., 1989, 42 pages.

Rediniotis, et al., "The Seven–Hole Probe: Its Calibration and Use," (invited paper), Forum on Instructional Fluid Dynamics Experiments, vol. 152, Jun., 1993, pp. 21–26.

Rediniotis, et al., "Dynamic Pitch–Up of a Delta Wing," *AIAA Journal*, vol. 32, No. 4, Apr., 1994, pp. 716–725.

Huston, "Accuracy of Airspeed Measurements and Flight Calibration Procedures," National Advisory Committee for Aeronautics, Technical Note No. 1605, pp. 1–80, Date Unknown.

Galls, et al., "Development of an Interactive, Real–Time, Multimedia Flow–Diagnostics Laboratory," Department of Aerospace Engineering Texas A&M University, 34th Aerospace Sciences Meeting & Exhibit, Jan. 15–18, 1996, pp. 1–11.

Atkins, et al., "Fiber–Optic, In–Cylinder Pressure Sensor Developed," Diesel & Gas Turbine Worldwide Product Report, Apr., 1995, 2 pages.

*Primary Examiner*—Joseph L. Felber
*Attorney, Agent, or Firm*—Baker & Botts, L.L.P.

[57] ABSTRACT

The development of a nearly-omni-directional pressure probe for three-velocity-component and pressure measurements is described, with particular focus on the techniques and technology employed in probe construction, calibration, electronic interfacing and frequency-response study. The device eliminates the velocity directionality limitations of current multi-hole probes and makes a valuable, rugged tool for use in complex 3-D flow mapping and aerodynamic design and evaluation, in basic research as well as industrial development settings. The probe performance is demonstrated in a flowfield with flow reversal downstream of a backward-facing step. The probe provides low-frequency response capabilities. The probe's main element is a multi-pressure port spherical head, which may include eighteen ports. Fiber optic interferometry techniques may be incorporated to significantly increase frequency response.

25 Claims, 4 Drawing Sheets

MULTI-DIRECTIONAL, THREE COMPONENT VELOCITY MEASUREMENT PRESSURE PROBE

CROSS REFERENCE TO RELATED APPLICATIONS

This application claims the benefit of U.S. Provisional Application Ser. No. 60/037,087 filed on Jan. 14, 1997, which is incorporated herein by reference.

TECHNICAL FIELD OF THE INVENTION

This invention generally relates to pressure probes and, more particularly, to a multi-directional velocity measurement pressure probe.

BACKGROUND

The design, evaluation and optimization of complex aerodynamic geometries involves extensive wind-tunnel testing and/or computationally-intensive numerical simulations. Even in the latter case, high-quality experimental wind-tunnel work with minimal, quantifiable errors is still necessary for code-validation purposes. Moreover, in aerodynamic testing facilities where large volumes of data need to be acquired in tight schedules, "down" time due to instrumentation lack of performance is highly undesirable. Such facilities include, among others, industrial testing wind tunnels, as well as high-productivity CFD code validation facilities.

In such environments, flow measurement techniques such as Laser-Doppler Velocimetry (LDV) and Particle Image Velocimetry (PIV), although powerful, usually require painstaking efforts for their successful usage. Costly components, complex setups, troublesome flow "seeding" requirements, lack of flexibility, ruggedness and mobility and ease of misalignment often render such techniques impractical. Moreover, in testing of complex three-dimensional geometries, accessibility of the entire flow-field around the model is an essential issue. When employing optical techniques, large sections of the flow-field are physically obstructed by the presence of the model. To access such regions, repositioning of the instrumentation setup may be necessary. This is a time-consuming process having associated potential pitfalls.

Multi-hole pressure probes have in many cases provided the easiest-to-use and most cost-effective method for three-component flow velocity measurements in research and industry environments. However, even though the measurement capabilities of such instruments have been expanded, the current pressure probe configurations and techniques have only a limited range of velocity inclinations that they can measure. Conventional probes are limited to five- or seven-hole configurations with conical probe heads. Current probes and techniques also have severe frequency-response limitations.

SUMMARY OF THE INVENTION

In accordance with the present invention, disadvantages and problems associated with pressure probes have been identified and addressed.

In one embodiment of the present invention, a pressure probe head is provided. The head includes a body having a plurality of pressure ports. The plurality of pressure ports includes eight or more pressure ports.

In another embodiment of the present invention, a spherical probe head is provided. The head may have one or more ports spaced about the surface of the head.

According to various aspects, the pressure ports are symmetrically spaced about a surface of the spherical head. The ports may be evenly distributed about the surface.

According to another aspect, eighteen pressure ports may be provided. The pressure ports may be provided in one or more five-port arrangements. Four of the ports of any given arrangement may be peripheral ports, which may be evenly spaced about a circle defined by a surface of the spherical body. The fifth port may be a central port, which may be located at the intersection of the sphere and a central axis of the circle. Each peripheral port may be shared by an adjacent five-hole configuration.

The head may be connected to a sting. The ports may be connected, via tubing, to pressure transducers incorporated in an integrated pressure scanner.

The ports may be distributed based on a spherical coordinate system. The spherical coordinate system may be aligned along a longitudinal axis of the sting.

The sting may include a number of parallel first pressure tubes corresponding to the number of pressure ports. Each of the pressure ports may be connected to a corresponding first pressure tube by a second pressure tube. Each of the second pressure tubes may extend normal to a surface of the head. The first tubes may be arranged according to a hexagonal arrangement within the sting.

BRIEF DESCRIPTION OF THE DRAWINGS

For a more complete understanding of the present invention, and the advantages thereof, reference is now made to the detailed description of the preferred embodiments in connection with the accompanying drawings, in which.

DETAILED DESCRIPTION OF THE INVENTION

Figure 3:
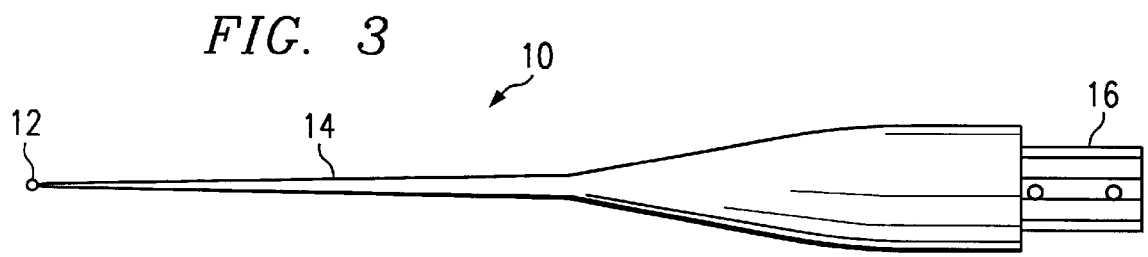
FIG. 3 is a schematic of a pressure probe in accordance with an embodiment of the present invention.

FIG. 3 depicts a probe assembly 10 in accordance with an embodiment of the present invention. Probe assembly 10 includes a probe head 12, a sting 14 and an integrated pressure scanner 16. Probe assembly 10 is configured to provide a near-omni-directional probe, which can measure almost any velocity vector regardless of its orientation and which operates in a wide range of Reynolds numbers in the incompressible regime of flows.

Figure 1:
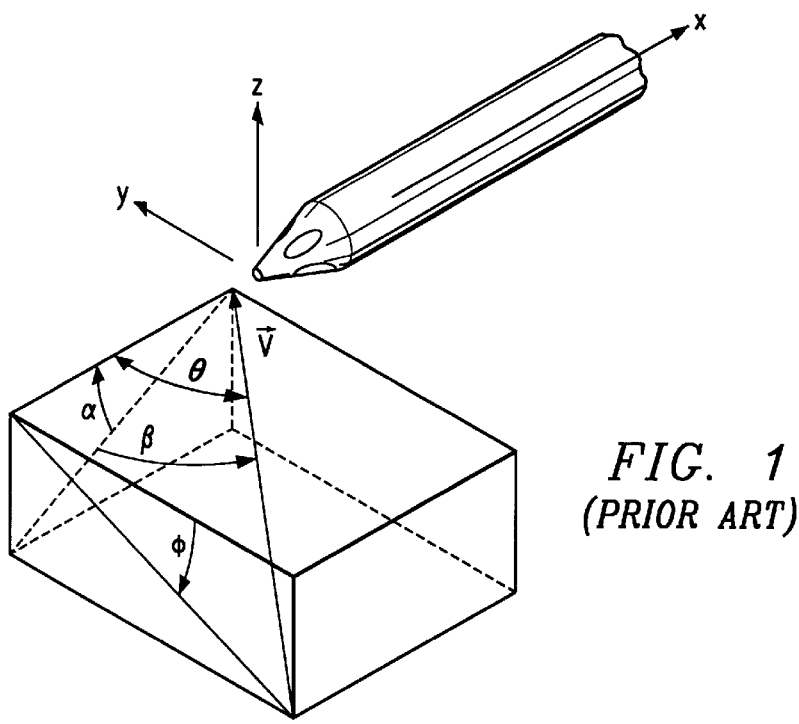
FIG. 1 depicts a seven-hole pressure probe and an angular coordinate system in accordance with the prior art.
Figure 2:
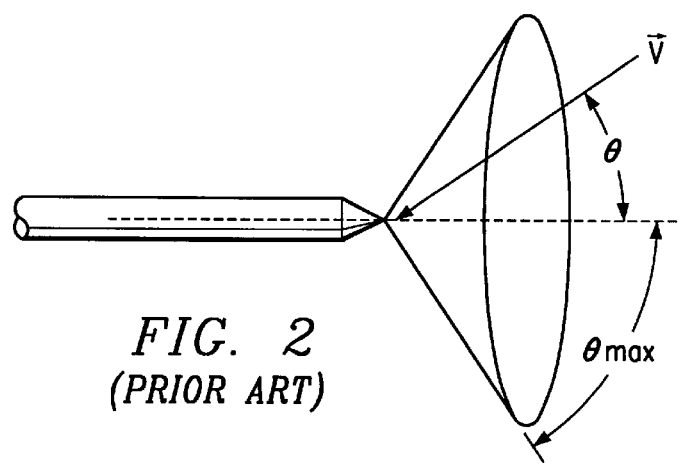
FIG. 2 depicts a probe cone angle in accordance with the prior art.

The present invention may be discussed in terms of certain directional conventions. A velocity inclination and a conventional seven-hole probe are shown in FIG. 1. The velocity inclination is indicated as angle θ. $\theta_{max}$ is the maximum velocity inclination that can be reliably measured by a probe. For example, a probe with a $\theta_{max}$ of 40° can accurately measure any velocity vector that is contained within a cone with its apex included angle of 80°. This included cone angle will be referred to as the cone angle. A cone angle for a conventional probe is depicted in FIG. 2.

Known devices are limited to a maximum measurable cone angle of 150°, which may be achieved with a seven-hole probe. By way of contrast, an embodiment of the present invention provides a probe head having a cone angle approximating 360°. A probe incorporating the head has a cone angle on the order of about 340°. Thus, the probe can measure virtually any velocity vector regardless of its orientation.

Conventional multi-hole probes may consist of several small diameter tubes axisymmetrically arranged inside a larger tube with one end machined into a cone. The apex of the cone coincides with the central hole which is surrounded by four or six equally-spaced holes. As can be seen from FIG. 1, a normal axis of each of the holes forms an acute angle with the longitudinal axis of the sting. These simple probes are limited to a small range of flow angularity.

Probe 10 preferably has a head with more than seven ports. In one embodiment, probe 10 has eighteen holes. Probe 10 may be utilized to overcome previous limitations with respect to the small range of flow angularity. To achieve a larger number of holes relative to conventional probes, the present invention incorporates a probe design which deviates from traditional five- and seven-hole probe designs. With conventional probe designs, additional holes are undesirable because they would complicate the design without improving the performance of the probe.

According to an embodiment of the present invention, a sphere is used as the basis for arranging the ports on probe head 12. The symmetry of the sphere allows for the realization of omni-directionality. No single hole is considered the "central" hole and the spherical shape changes the "straight through" tubing configuration found in conventional five- and seven-hole probes. According to an aspect of this embodiment, a particular arrangement of eighteen holes on a sphere facilitates a feasible design.

Figure 4:
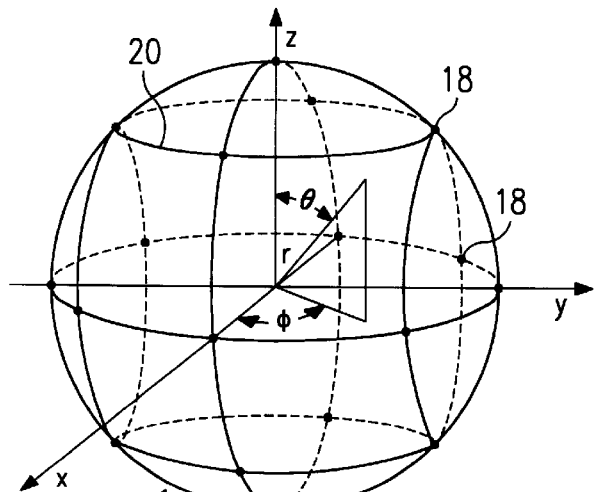
FIGS. 4 depicts positioning of pressure ports about a spherical probe head in accordance with an embodiment of the present invention.

The basic structural features of the spherical probe head are illustrated in FIGS. 4–7. For clarity the port arrangement on the spherical probe head 12 is presented in two different coordinate systems. A coordinate system that emphasizes the grouping of the eighteen ports in six five-hole configurations is shown in FIG. 4. In FIG. 4, the sting 14 is omitted for clarity. In the coordinate system of FIG. 4, pressure ports 18 are represented by black dots and are distributed as follows (in terms of their spherical coordinates):

8 ports at θ=90° and φ=0°, 45°, 90°, 135°, 180°, 225°, 270° and 315°;

4 ports at φ=0° and θ=0°, 45°, 135°, 180°;

2 ports at φ=180° and θ=45°, 135°;

2 ports at φ=90° and θ=45°, 135°; and 2 ports at φ=270° and θ=45°, 135°

The ports 18, when properly combined in six groups of five, as indicated in FIG. 4, form a network of five-hole probe configurations. An example of one of the six five-hole probe groups is the group of four peripheral ports coinciding with circle 20 plus the central port coinciding with the intersection between the sphere and the positive z-axis. Each one of these configurations is operable as a five-hole probe. The central ports of these five-hole configurations are the ports located at the intersections of the x-, y- and z-coordinate axes with the surface of the sphere. As can be seen, each of the four peripheral ports of a given five-hole configuration is also a peripheral port for an adjacent five-hole configuration. Therefore, even though there are six five-hole configurations, there are only a total of eighteen ports.

Figure 5:
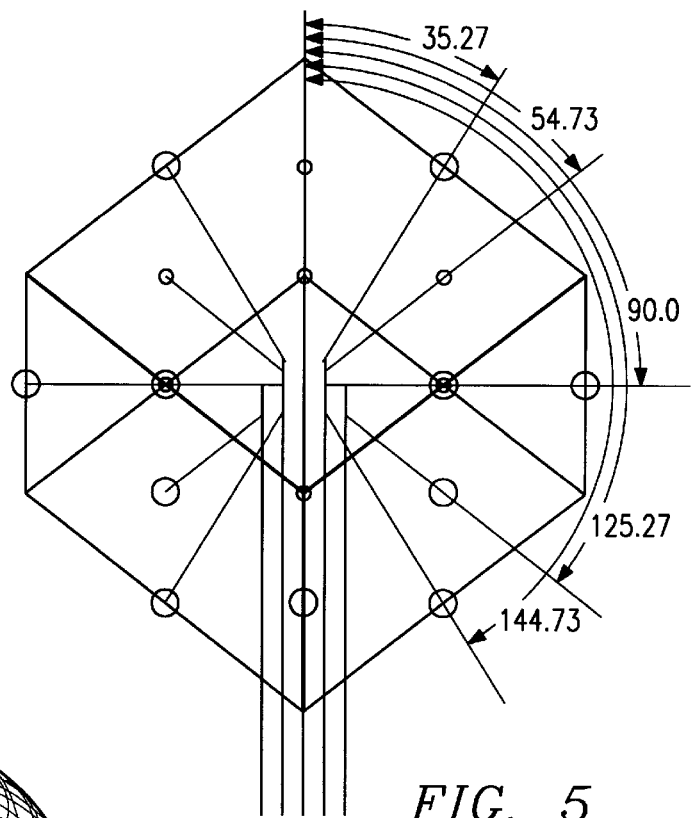
FIG. 5 depicts positioning of pressure ports according to a sting-aligned spherical coordinate system in accordance with an embodiment of the present invention.

In terms of construction and calibration, the port arrangement is best visualized in the spherical coordinate system of FIG. 5, which is aligned with the sting. One may consider a cube, with a port placed at the center of each one of its six sides and a port placed at the midpoint of each one of its twelve edges. This allows for six five-hole configurations, one on each face of the cube. If a sphere is now inscribed within the cube, the eighteen-hole probe head takes shape.

Probe sting 14 obviously interferes with the global symmetry of the spherical probe. Preferably, however, its effect is minimized by having the sting enter along a major diagonal of the cube, thus intersecting the sphere at the geometrical center of three adjacent five-hole port configurations. In this coordinate system, the pressure ports are located as follows (θ referenced from the sting axis, as shown in FIG. 5):

ports 1–3 at θ=35.27° and φ=60°, 180°, 300°;

ports 4–6 at θ=54.73° and φ=0°, 120°, 240°;

ports 7–12 at θ=90.00° and φ=30°, 90°, 150°, 210°, 270°, 330°;

ports 13–15 at θ=125.27° and φ=60°, 180°, 300°; and ports 16–18 at θ=144.73° and φ=0°, 120°, 240°

Another advantage of this configuration is that the holes align themselves with the sting in such a way as to facilitate hexagonal spacing of the tubes inside the sting, which in turn minimizes the thickness or diameter of the sting.

Figure 6:
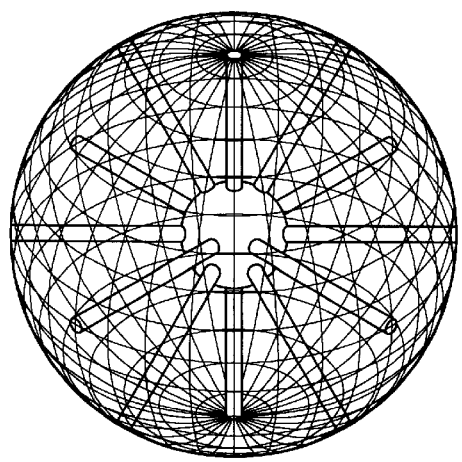
FIG. 6 depicts pressure tubes associated with pressure ports of a pressure probe according to an embodiment of the present invention.
Figure 7:
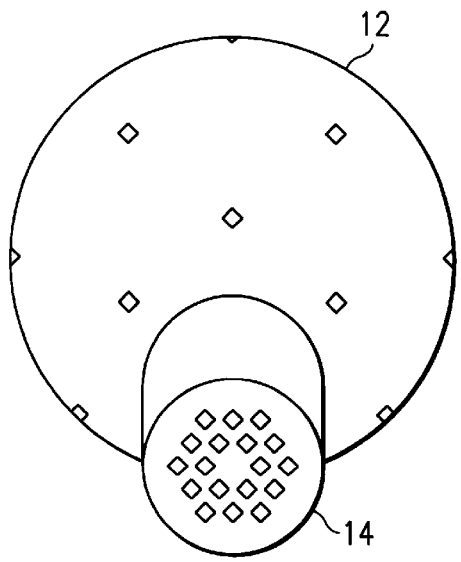
FIG. 7 depicts a probe head of a pressure probe according to an embodiment of the present invention.

The internal tubing of the sphere is significantly more complex than that of five- or seven-hole probe designs. Preferably, precision machining of a brass sphere is used to drill holes at each of the individual ports normal to the spherical surface of probe head 12. These holes are then intersected with 18 parallel holes drilled from the back of sting 14. FIG. 6 shows the internal tubing structure as viewed along the longitudinal axis of the sting 14. FIG. 7 is a partial perspective schematic of the fabricated probe assembly 10, showing the drilled holes on the spherical surface of probe head 12 and on the base of sting 14.

Preferably, each of these holes is on the order of about 0.010" in diameter. This dimension imposes, by geometry, a low limit to the sting diameter and, implicitly low limit to the sphere diameter. The result is a spherical probe head of about 0.242" in diameter with a sting of about 0.090" in diameter. The present invention is not limited to components of these sizes and larger or smaller measurements may be incorporated depending, for example, on the application.

In general, the size of probe 10 is preferably kept small for minimum possible intrusiveness and maximum possible spatial resolution, but yet large enough to allow for limited temporal resolution capabilities. The pressure measurement hardware is designed to be integrated close to the probe head to avoid long pressure tubing that would significantly increase data-acquisition times. A probe head with the above-described dimensions, combined with the preferred tubing configuration yields transient times in the pressure tubing as low as 0.2 sec.

The sting 14 obviously affects the flowfield sensed by the adjacent five-hole configurations. This effect may be at least partly accounted for in the calibration process. Preferably, the probe assembly 10 is calibrated for a Reynolds number range in which laminar flow separation occurs over the spherical probe head 12. Noting that, typically, transition to turbulent separation occurs on spheres at a diameter-based Reynolds number of $3 \times 10^5$, it can be calculated that a 0.242"-diameter probe head experiences laminar separation for the entire range of incompressible conditions.

Preferably, each one of the probe surface pressure ports 18 is connected through tubing to a pressure transducer. Therefore, a total of eighteen pressure transducers are used. Mechanical Scanivalve™ systems that utilize only one pressure transducer and mechanical scanning are not good candidates due to their slow pressure data acquisition rates. According to an aspect of the invention, the probe assembly may incorporate a miniature integrated electronic pressure scanner, which includes the eighteen pressure transducers. Preferably, the scanner is located close to the spherical probe head. This allows for much shorter length of tubing, thereby increasing the frequency response of the entire system.

Preferably, each one of the five-hole configurations is calibrated to provide accurate measurement of any velocity vector within a cone angle of 120° or, equivalently, any velocity vector with $\theta_i<=60°$, where $\theta_i$ measures from the axis of the $i^{th}$ five-hole configuration (i=1 to 6). Thus, if, all six five-hole configurations and their measurement ranges are combined together, any possible velocity vector can be accurately measured.

Figure 8:
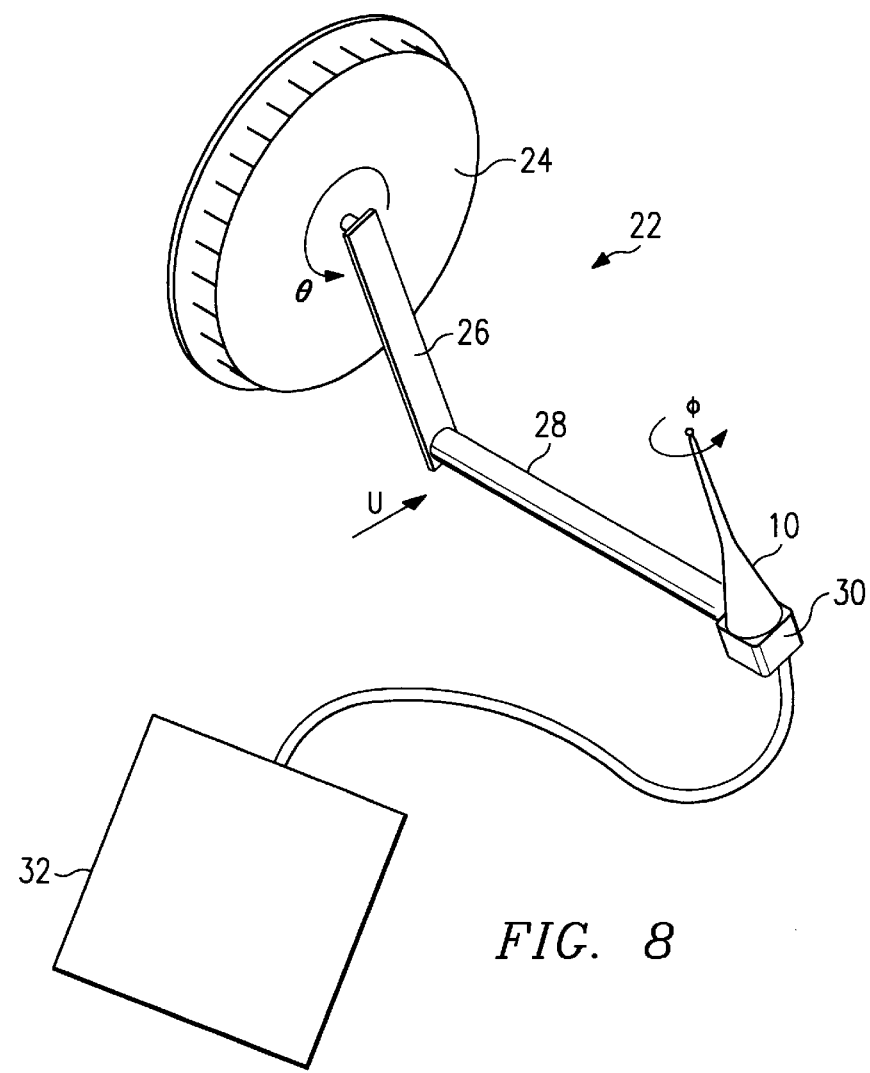
FIG. 8 is a perspective view of a pressure probe calibration assembly in accordance with the present invention.

With respect to calibration, the spherical probe head may be first calibrated with the apparatus described in this section and then assembled with its dedicated electronics to form the probe shown in FIG. 3. A probe calibration assembly 22 is shown in FIG. 8. Calibration assembly 22 includes a base 24 and a first arm 26 which rotates about a first axis passing through the center of and normal to the surface of base 24. First arm 26 is offset 90° from the first axis. A second arm 28 is coupled to an end of first arm 26 and is offset 90° from first arm 26. Second arm 28 is parallel to the first axis. A probe mount 30 is provided at the end of second arm 28. Probe mount 30 is preferably capable of rotating probe assembly 10 about a second axis perpendicular to the first axis. Thus, probe assembly 10 is rotatable about two perpendicular axes.

Probe assembly 10 may be mounted to calibration assembly 22, such that probe assembly 10 is disposed, for example, in a wind tunnel. The wind tunnel may be, for example, either a 3'×4' or a 2'×3' wind tunnel. Calibration assembly 22 includes a dual-axis stepper-motor to provide rotation about the first and second axes. Calibration assembly 22 is preferably computer-controlled and capable of varying the cone and roll angles (θ, φ) at least within the ranges 0° to 180° and –180° to 180°, respectively. Thus, a 4π solid angle of the calibration domain may be covered.

In a test of the above-described apparatus, the cone angle was varied between 0° and 160°. While the cone angle could be rotated to the full 180°, the sting interferes with the accuracy of calibration in the 160°–180° range. The test resulted in a calibration range corresponding to a solid angle of 3.72π or 93.3% of the total possible velocity orientation range corresponding to a solid angle of 4π. The positioning resolution for calibration assembly 22 was 0.32° in cone and 0.9° in roll, allowing for a maximum of 375,000 calibration data points over the 3.72π solid angle. Preferably, approximately 10,000 calibration points are used to calibrate the probe.

Preferably, the calibration assembly 22 positions the probe according to a user-defined array of probe orientations ($\theta_i$, $\phi_i$), i=1, . . . ,m. The integrated scanner 16 is preferably connected to a computer 32, which may include a data acquisition system. The data acquisition system collects nineteen pressures referenced to the wind tunnel static pressure. Eighteen pressure measurements correspond to the eighteen pressure ports of the probe. One pressure measurement corresponds to the stagnation port of a pitot tube, which is preferably located upstream and away from the probe assembly.

During testing, pressure data acquisition was accomplished with an alternative to the above-described integrated pressure scanner. Pressure data-acquisition was performed with a 32-transducer Electronic Pressure Scanner (ESP)™ from PSI, Inc. with a full scale pressure of ±20 in $H_2O$. The ESP™ pressure scanner was interfaced with a laboratory computer and was calibrated on-line.

Calibration and data acquisition was performed in the 3'×4' Aerospace Engineering Wind Tunnel of Texas A&M University. This is a closed-circuit tunnel with a test section equipped with a breather so that the static freestream pressure is equal to the control room pressure. The clear Plexiglas™ test section was four feet wide, three feet tall and six feet long. The test section was accessible from the side either through a swinging door or through three round manholes on one of which the calibration assembly 22 was mounted. The contraction ratio was 9 to 1. The maximum speed achieved in the tunnel was about 200 ft/sec with a free-stream turbulence less than 0.16%. To avoid temperature variations over time there was an active cooling system to keep freestream temperature at about 60° F. during testing.

Figure 9:
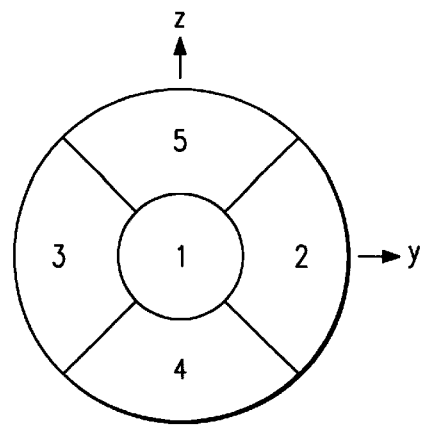
FIG. 9 depicts low- and high-angle flow regimes for a five-hole port arrangement of a pressure probe in accordance with an embodiment of the present invention.

In order to describe the technique used to reduce the eighteen pressures acquired in a flow survey experiment to the three velocity components and the local static pressure, one may consider one of the six five-hole configurations. The flow over a five-hole probe can be divided into two flow regimes—a low-angle regime and a high-angle regime as shown, for example, in FIG. 9. The low-angle flow regime is defined as the θ range for which the pressure registered by the central port, is the highest among the five measured pressures. In FIG. 9, this regime is identified as domain 1. FIG. 9 represents the possible relative velocity/probe orientations, in terms of pitch and yaw angles (α, β in FIG. 1). It should be noted here that there is a one-to-one correspondence between the pairs (α, β) and (θ, φ) defined by the following relations:

$\sin(\theta)\sin(\phi)=\sin(\alpha)\cos(\beta)$
$\sin(\theta)\cos(\phi)=\sin(\beta)$ Each domain in FIG. 9 is identified by a number indicating the hole that senses the highest pressure for all the possible velocity orientations in that domain. For high-angle flows the highest pressure occurs in one of the peripheral domains 2 through 5, which correspond to the four outer ports of the five-hole configuration. The high-angle regime thus includes domains 2 through 5.

At every measurement location in a flow mapping experiment, the local velocity vector can be fully characterized by four variables: pitch α, yaw β, total pressure coefficient $A_t$, static pressure coefficient $A_s$ (for the low-angle regime) or cone θ, roll φ, $A_t$, $A_s$ (for the high-angle regime). Therefore, these variables need to be determined as functions of the five measured pressures or equivalently, the two nondimensional pressure coefficients $B_c$, $B_r$ formed from these pressures.

The definitions of all the above variables are:

Low-angle regime (domain 1):

$$B_c=(P_5-P_4)/Q', \ B_r=(P_2-P_3)/Q'$$

$$A_t=(P_1-P_t)/Q', \ A_s=(P_1-P_s)/Q'$$

(where $Q'=P_1-(P_2+P_3+P_4+P_5)/4$ and $P_t$ is the local total pressure and $P_s$ is the local static pressure)

High-angle regimes (domains 2 through 5):

$$B_c=(P_i-P_1)/Q', \ B_r=(P_i^+-P_1^-)/Q'$$

$$A_t=(P_i-P_t)/Q', \ A_s=(P_i-P_s)/Q'$$

(where $Q'=P_i-(P_i^++P_i^-)/2$; $P_i$ is the highest detected pressure; and where $P_i^+$ and $P_i^-$ are the pressures of the two peripheral holes adjacent to, and either side, of hole i)

Referring to FIG. 9, $P_i^+$ is adjacent to $P_i$ in the clockwise direction and $P_i^-$ in the counter-clockwise direction. The angles $\alpha$, $\beta$, $\theta$, $\phi$, have already been defined in FIG. 1.

Figure 10:
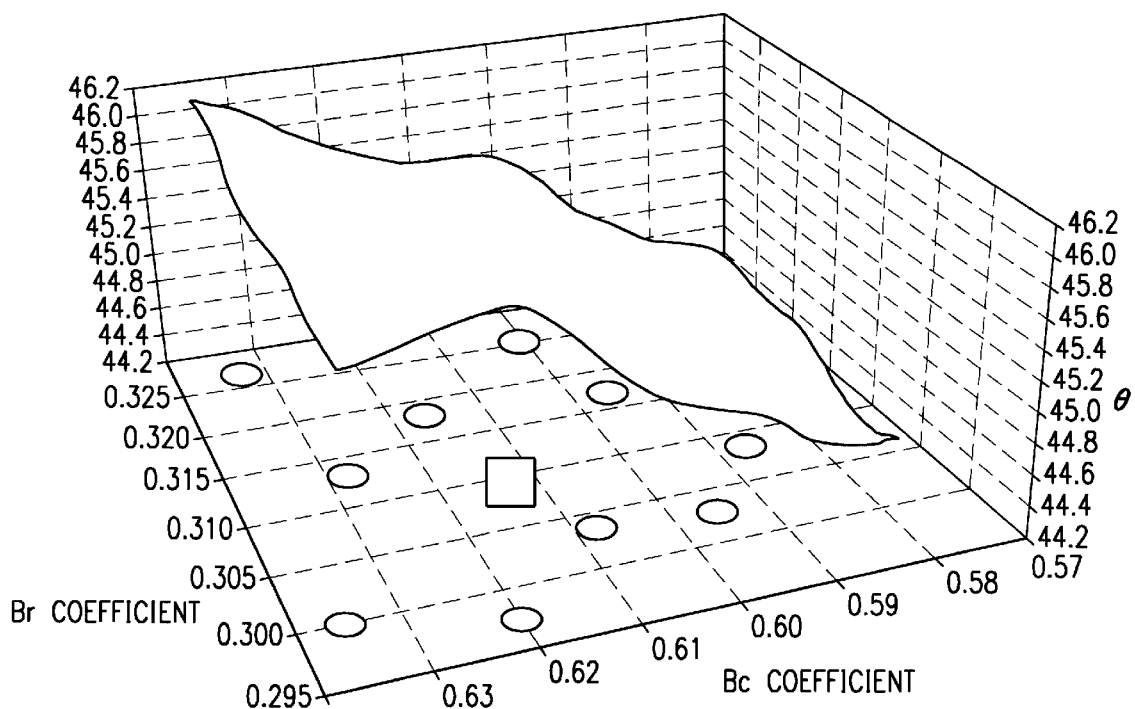
FIG. 10 is a graphical display of calibration data points for a calibration technique according to the present invention.

To resolve the u, v, w velocity components from the eighteen hole probe press data, a multiple-point interpolation algorithm may be employed. A large set of calibrated data containing known cone, roll, and pressure information is taken using the previously discussed calibration apparatus. The set of test data containing only known pressures is then reduced by the following procedure. Given a single test point, the port with maximum pressure is detected and the corresponding low- or high-angle calibration sector is determined. The calibration data is then searched, the calibration points associated with the particular sector are identified and the $n^{th}$ closest points to the test point (in terms of proximity in the $\{B_c, B_r\}$ plane, as shown in FIG. 10) are retained. The number n is user-defined. FIG. 10 graphically depicts the interpolation that is performed for cone angle $\theta$. Each of the n selected calibration points (represented by circles in FIG. 10) has an angle $\theta$ associated with it. The calibration algorithm calculated the surface $\theta$ versus $\{B_c \ B_r\}$ that corresponds to the n selected calibration points. This surface is then interpolated to find the cone angle of the test point (represented by a square in FIG. 10). This interpolation procedure is repeated for the other three variables ($A_t, A_s, \phi$). This technique may be used for $\alpha$, $\beta$, $A_t$ and $A_s$ in the low-angle regime. During testing, a backward-facing step was constructed in the test section of the 3'×4' wind tunnel. The step height was H=6" and spanned the entire tunnel width. A flow survey downstream of the step was conducted with the eighteen-hole probe, along a plane parallel to the free stream and perpendicular to the tunnel floor. Data was taken on a 72 ×13 point orthogonal grid with a 0.51" spacing in both directions. The freestream velocity was 75 ft/sec corresponding to a Reynolds number, based on the step height, of 0.22 ×10$^6$.

Figure 11:
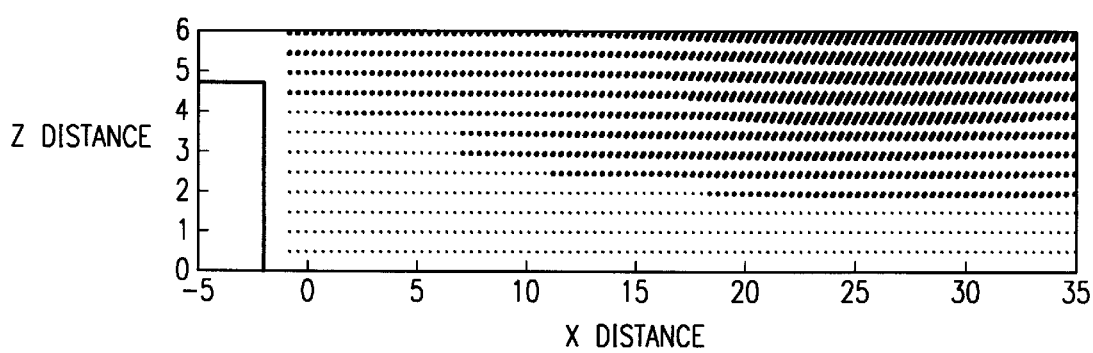
FIG. 11 represents a velocity vector plot downstream of a backward-facing step.

FIG. 11 depicts a velocity vector plot downstream of the step. The velocity component perpendicular to the graph was consistently measured to be within +/−1.5 ft/sec. If the flow is assumed to be perfectly two-dimensional, this reading corresponds to an error of 2%.

Although a particular embodiment has been described in which eighteen ports are spaced evenly about a spherical head, the present invention is not so limited. According to other aspects, the head may comprise other shapes, so long as the number of ports is increased to eight or more. For example, a partial sphere. Another alternative may include a multifaceted geometric shape approximating a sphere. Other possible head shapes exist.

Also, a spherical head with greater or fewer than eighteen ports may be used. Further, a head may be used in which not all of the ports are symmetrically or evenly spaced.

Also, the number and arrangement of pressure ports on the head may be varied. Preferably, the number and configuration are such that the cone angle is greater than the maximum 150° cone angle of conventional probes.

As discussed above, conventional probes are characterized by the fact that a normal axis extending from each port forms an acute angle with the axis of the sting. The present invention provides a probe in which at least one port has a normal axis forming at least a 90° angle with the sting axis. Preferably, at least one such angle is obtuse.

The present invention has been described in connection with the preferred embodiments which are intended as examples only. It will be understood by those having ordinary skill in the pertinent art that modifications to the preferred embodiments may be easily made without materially departing from the scope and spirit of the present invention as defined by the appended claims.

What is claimed is:

1. A pressure probe, comprising:
   a sting; and
   a head mounted on an end of the sting, the head comprising a spherical body and having one or more pressure ports formed therein.

2. The pressure probe of claim 1, wherein the one or more pressure ports are symmetrically distributed about a surface of the spherical body.

3. The pressure probe of claim 1, wherein the one or more pressure ports are evenly spaced about a surface of the spherical body.

4. The pressure probe of claim 1, wherein the one or more pressure ports comprises eight or more pressure ports.

5. The pressure probe of claim 1, wherein the one or more pressure ports comprises eighteen pressure ports.

6. The pressure probe of claim 5, the one or more pressure ports being spaced according to a spherical coordinate system in which $\theta$ is the angular offset from the z-axis and $\phi$ is the angular offset from the x-axis, and wherein
   eight ports are located at $\theta=90°$ and $\phi=0°, 45°, 90°, 135°, 180°, 225°, 270°$ and $315°$, respectively,
   four ports are located at $\phi=0°$ and $\theta=0°, 45°, 135°, 180°$, respectively,
   two ports are located at $\phi=180°$ and $\theta=45°, 135°$, respectively,
   two ports are located at $\phi=90°$ and $\theta=45°, 135°$, respectively, and
   two ports are located at $\phi=270°$ and $\theta=45°, 135°$, respectively.

7. The pressure probe of claim 5, the plurality of pressure ports being spaced according to a spherical coordinate system in which the z-axis is aligned with a longitudinal axis of the sting, and in which $\theta$ is the angular offset from the z-axis and $\phi$ is the angular offset from the x-axis, and wherein
   three pressure ports are located at $\theta=35.27°$ and $\phi=60°, 180°, 300°$, respectively,
   three pressure ports are located at $\theta=54.73°$ and $\phi=0°, 120°, 240°$, respectively,
   six pressure ports are located at $\theta=90.00°$ and $\phi=30°, 90°, 150°, 210°, 270°, 330°$, respectively, three pressure ports are located at θ=125.27° and φ=60°, 180°, 300°, respectively, and wherein three pressure ports are located at θ=144.73° and φ=0°, 120°, 240°, respectively.

8. The pressure probe of claim 1, the sting comprising a number of parallel first pressure tube portions corresponding to the number of pressure ports, each of the pressure ports being connected to a corresponding first pressure tube portion by a second pressure tube portion, each of the second pressure tube portions extending normal to a surface of the head.

9. The pressure probe of claim 8, wherein the first pressure tube portions are hexagonally arranged within the sting.

10. The pressure probe of claim 1, wherein the one or more pressure ports comprises one or more multi-port configurations, each configuration comprising a central port surrounded by a plurality of evenly spaced peripheral ports.

11. The pressure probe of claim 10, wherein each of the peripheral ports is shared by an adjacent multi-port configuration.

12. The pressure probe of claim 1, wherein the one or more pressure ports comprises one or more five-port configurations, each five-port configuration having four peripheral ports evenly spaced about a circle defined by a surface of the spherical body and a central port located at the intersection of the sphere and a central axis of the circle.

13. The pressure probe of claim 12, each five-port configuration providing a 120° cone angle.

14. The pressure probe of claim 1, further comprising an integrated pressure scanner having a number of pressure transducers corresponding to the number of pressure ports, each pressure transducer connected to a discrete pressure port through a pressure tube.

15. The pressure probe of claim 1, wherein the one or more pressure ports are arranged to provide a cone angle greater than 150 degrees.

16. The pressure probe head of claim 15 wherein the one or more pressure ports comprises eight or more pressure ports.

17. The pressure probe head of claim 15 wherein the one or more pressure ports comprises eighteen pressure ports.

18. The pressure probe of claim 1, wherein the one or more pressure ports are arranged to provide a cone angle greater than 300 degrees.

19. The pressure probe of claim 1, wherein the one or more pressure ports are arranged to provide a cone angle on the order of about 340 degrees.

20. The pressure probe head of claim 19 wherein the pressure ports are symmetrically spaced about the surface of the spherical body.

21. The pressure probe head of claim 19 wherein the pressure ports are evenly spaced about the surface of the spherical body.

22. The pressure probe of claim 1, wherein the one or more pressure ports are arranged to provide a cone angle of approximately 360 degrees.

23. The pressure probe of claim 1, wherein at least one of the one or more pressure ports has a normal axis which forms an obtuse angle with a longitudinal axis of the sting.

24. A pressure probe head for use in a pressure probe, the head comprising a spherical body having one or more pressure ports formed in a surface thereof.

25. A pressure probe comprising:

a sting; and a head mounted on the sting, the head comprising a body having eight or more independent pressure ports.

* * * * *